US007245091B2

(12) United States Patent

Huang

(10) Patent No.: US 7,245,091 B2

(45) Date of Patent: Jul. 17, 2007

(54) INVERTER CAPABLE OF SWITCHING WORKING FREQUENCY

(75) Inventor: Chung-Jung Huang, Pingjhen (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 11/279,905

(22) Filed: Apr. 17, 2006

(65) Prior Publication Data

US 2006/0244394 A1 Nov. 2, 2006

(30) Foreign Application Priority Data

Apr. 29, 2005 (TW) .............................. 94113957 A

(51) Int. Cl.
*H05B 41/36* (2006.01)
*H05B 39/00* (2006.01)
*H02M 3/335* (2006.01)

(52) U.S. Cl. ......................... 315/311; 315/291; 363/15

(58) Field of Classification Search ................ 315/291, 315/307, 311–312, 224, 276, 293, 314, DIG. 1, 315/DIG. 2, DIG. 4, DIG. 5, DIG. 7; 363/15–16, 363/18, 21.07, 21.09, 21.1
See application file for complete search history.

(56) References Cited

U.S. PATENT DOCUMENTS 5,883,473 A * 3/1999 Li et al. ..................... 315/225
5,969,483 A * 10/1999 Li et al. ..................... 315/225
6,075,326 A * 6/2000 Nostwick .................... 315/307
6,515,436 B2 * 2/2003 Kobayashi et al. ......... 315/307
2003/0155349 A1 * 8/2003 Matsuo et al. .............. 219/664

* cited by examiner

*Primary Examiner*—Shih-Chao Chen
*Assistant Examiner*—Minh Dieu A
(74) *Attorney, Agent, or Firm*—Thomas, Kayden, Horstemeyer & Risley

(57) ABSTRACT

An inverter capable of switching working frequency for activating a lamp. The inverter comprises a voltage converter, a feedback circuit, a control unit and a frequency switcher. The voltage converter transforms a DC input voltage into a second AC voltage according to a control signal. The lamp is activated and generates a feedback current. The circuit converts the feedback current into the feedback voltage. The control unit for generating a first working frequency includes a resonance circuit having a specific resistance and capacitance, and a control device for generating the control signal according to a reference voltage, the first working frequency and the feedback voltage in a predetermined period. Then, the switcher changes the specific resistance and/or capacitance for enabling the control unit to generate a second working frequency. The control device outputs the control signal according to the second working frequency and the feedback voltage.

17 Claims, 4 Drawing Sheets

INVERTER CAPABLE OF SWITCHING WORKING FREQUENCY

This application claims the benefit of Taiwan application Ser. No. 94113957, filed Apr. 29, 2005, the subject matter of which is incorporated herein by reference.

BACKGROUND OF THE INVENTION

1. Field of the Invention

The invention relates in general to an inverter, and more particularly to an inverter capable of switching working frequency.

2. Description of the Related Art

With the coming of the digital age and the popularization of the computer network, the display has been inevitably flattened and thinned. The inverter, which is a key component for activating a lamp in the flat panel display, determines the reliability and the stability of the lamp, and the performance of the inverter directly influences the display quality of the flat panel display. Due to the requirement in the market, the size of the display panel is getting larger and larger, and the length of the lamp is getting longer and longer. Thus, the working frequency of the lamp has a greater influence on the activation process. So, how to select a suitable working frequency has become a great focus in the industry.

FIG. 1 is a block diagram showing a conventional inverter. Referring to FIG. 1, a conventional inverter 100 includes a power device 112, a transformer 114, a feedback circuit 130 and a control unit 140. The power device 112 receives a DC input voltage from a DC power 500, converts the DC input voltage into a first AC voltage according to a control signal, and then outputs the first AC voltage. The transformer 114 receives the first AC voltage, transforms the first AC voltage into a second AC voltage, and then outputs the second AC voltage to a lamp 600. The lamp 600 is activated by the second AC voltage and generates a feedback current. The feedback circuit 130 receives the feedback current and outputs a feedback voltage according to the feedback current. The control unit 140 includes a resonance circuit 142 and a control device 144. The resonance circuit 142 includes a resonance capacitor Ct and a resonance resistor Rt. The control unit 140 can generate a working frequency according to the resonance resistor Rt and the resonance capacitor Ct. The control device 144 receives the feedback voltage and generates the control signal for controlling the AC voltage outputted from the power device 112 to the lamp 600 according to the working frequency and the feedback voltage.

The lamp 600 requires different working frequencies in different working states. For example, at a transient period after the inverter 100 initially activates the lamp 600, the gas and the metal elements in the lamp 600 are activated but not stable. This problem becomes more serious especially in a low-temperature environment. In this case, a lower working frequency, such as the working frequency of 45 KHZ, is required to activate the lamp 600 such that the lamp 600 has a better performance. After the transient period, the lamp 600 reaches a steady state, in which the gas and the metal elements in the lamp 600 have been activated to reach a stable state. In this case, a working frequency higher than 45 KHZ is required to activate the lamp 600. For example, the working frequency of 50 KHZ is required to activate the lamp 600 such that the lamp 600 has a better performance.

However, the conventional inverter 100 can only activate the lamp 600 with the same working frequency. The designer for the conventional inverter 100 can only select either the frequency suitable for the initial activation of the lamp or the frequency suitable for the steady state of the lamp as the final working frequency. If the working frequency suitable for the steady state is selected, the lamp 600 tends to flicker due to the impedance matching problem in the aforementioned initial transient period. Thus, the waveform of the AC voltage is unstable during that transient period. If the working frequency suitable for aforementioned initial transient period is selected, the lamp 600 can work normally in a predetermined period after the lamp 600 is initially activated. However, the problems of unsymmetry of the waveforms of the positive half cycle and the negative half cycle of the AC voltage, the waveform distortion, and the uneven currents among several lamps would occur after that transient period. Thus, the problem of the insufficient luminance, the nonuniform luminance or the shortened lifetime will further be caused. The problem will become more serious especially when the dimension of the lamp 600 is getting larger and larger.

SUMMARY OF THE INVENTION

It is therefore an object of the invention to provide an inverter capable of switching working frequency by providing a first working frequency for enabling a lamp to work properly in a transient period after the lamp turns on and before the lamp reaches a steady state, and providing a second working frequency for enabling the lamp to work properly in the steady state. Thus, the inverter can make the lamp work in optimum conditions under two different states according to the working frequency suitable for the lamp.

The invention achieves the above-identified object by providing an inverter capable of switching working frequency. The inverter is electrically connected to a lamp. The inverter includes a voltage converter, a feedback circuit, a control unit and a frequency switcher. The voltage converter receives a DC input voltage, transforms the DC input voltage into a second AC voltage according to a control signal, and then output the second AC voltage. The lamp is activated by the second AC voltage and generates a feedback current. The feedback circuit receives the feedback current and then outputs a feedback voltage according to the feedback current. The control unit includes a resonance circuit and a control device. The resonance circuit includes a resonance capacitor and a resonance resistor. The control unit generates a first working frequency according to the resonance capacitor and the resonance resistor. The control device receives the feedback voltage and generates the control signal according to the first working frequency, a reference voltage and the feedback voltage in a predetermined period. The frequency switcher is electrically connected to the resonance circuit. After the predetermined period, the frequency switcher changes at least one of the resistance and the capacitance of the resonance circuit to make the control unit generate a second working frequency. At this time, the control device outputs the control signal according to the second working frequency, the reference voltage and the feedback voltage.

The voltage converter may further include a power device and a transformer. The power device receives the DC input voltage, converts the DC input voltage into the first AC voltage according to the control signal, and then outputs the first AC voltage. The transformer receives the first AC voltage, transforms the first AC voltage into the second AC voltage, and then outputs the second AC voltage to the lamp.

Other objects, features, and advantages of the invention will become apparent from the following detailed description of the preferred but non-limiting embodiments. The following description is made with reference to the accompanying drawings.

DETAILED DESCRIPTION OF THE INVENTION

The lamp is activated using an inverter to transform a DC input voltage into a high AC voltage with high frequency. In different activating periods, different working frequencies are required. For example, when the lamp is turned on, the activated reaction in the lamp does not reach a steady state. In the transient period, it is preferred that the inverter provides a relatively lower working frequency, such as 45 KHZ, to activate the lamp. After a period of time has elapsed, the activated state of the reaction in the lamp becomes steadier, and the inverter may need to output a working frequency higher than 45 KHZ, such as 50 KHZ, to activate the lamp. Thus, the lamp can have a better performance if the inverter can generate suitable working frequencies according to the transient period after the lamp is turned on and the period after the lamp reaches the steady state, respectively.

Figure 1:
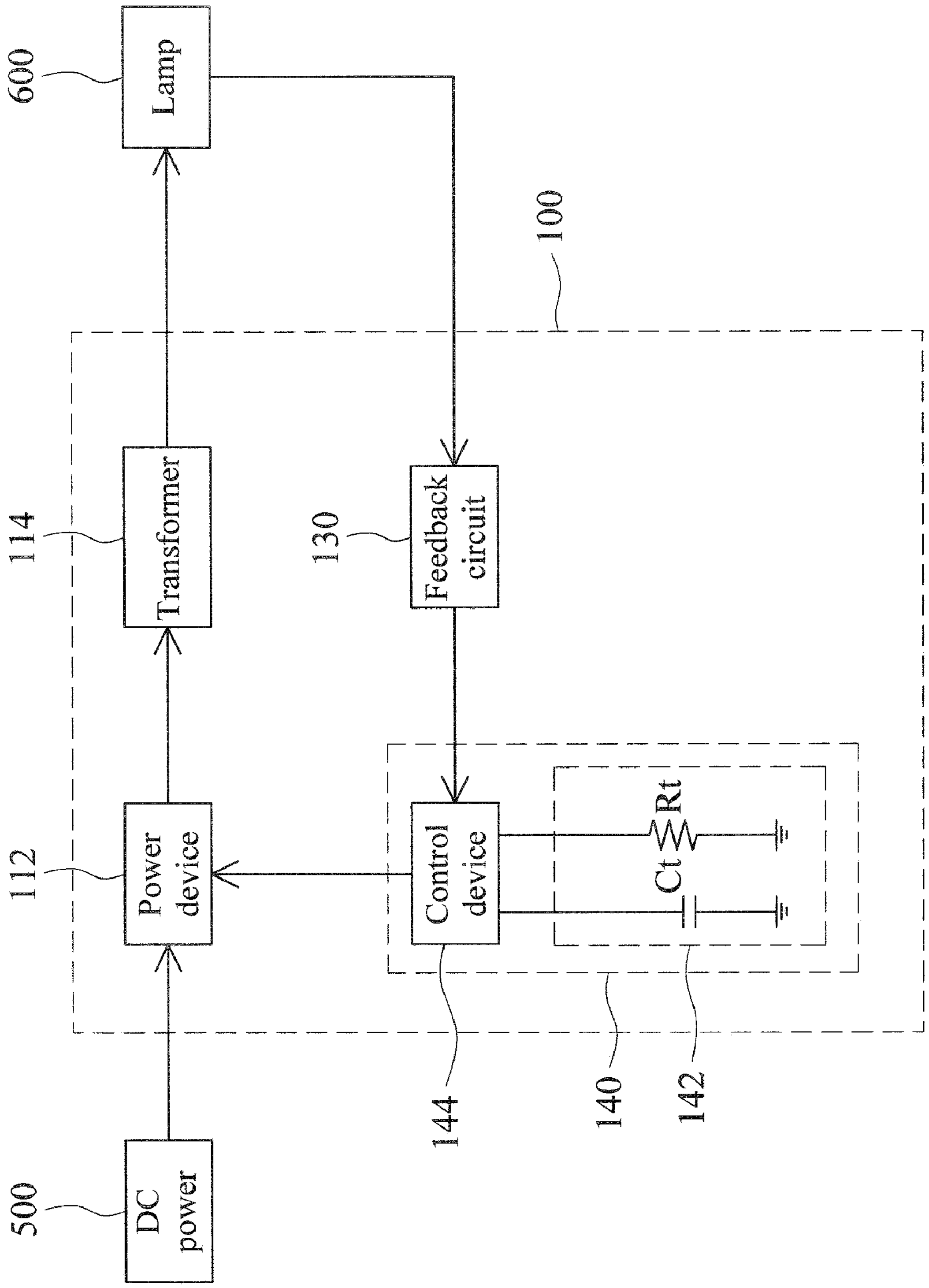
FIG. 1(PRIOR ART)
FIG. 1 is a block diagram showing a conventional inverter.
Figure 2:
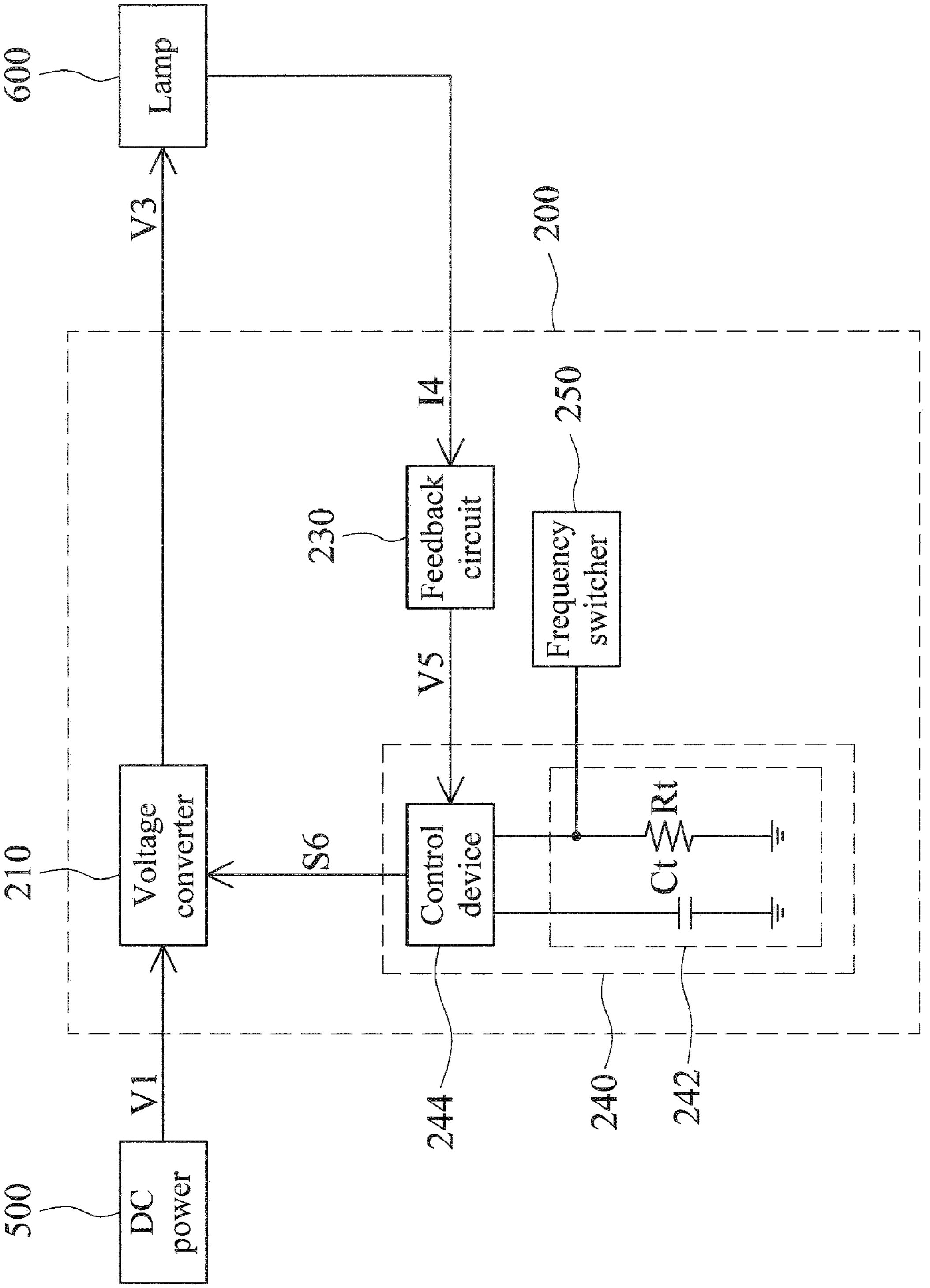
FIG. 2 is a block diagram showing an inverter capable of switching working frequency according to the invention.

FIG. 2 is a block diagram showing an inverter capable of switching working frequency according to the invention. As shown in FIG. 2, an inverter 200 is electrically connected to a lamp 600, which requires a short period of time from the initial activation state to the stable state. The inverter 200 includes a voltage converter 210, a feedback circuit 230, a control unit 240 and a frequency switcher 250. The voltage converter 210 receives a DC input voltage V1 from a DC power 500, transforms the DC input voltage V1 into a second AC voltage V3 according to a control signal S6, and then outputs the second AC voltage V3 to the lamp 600. The lamp 600 is activated by the second AC voltage V3 and generates a feedback current 14. The feedback circuit 230 converts the feedback current 14 into a feedback voltage V5, and outputs the feedback voltage V5 to the control unit 240.

The control unit 240 includes a resonance circuit 242 and a control device 244. The resonance circuit 242 includes a resonance capacitor Ct and a resonance resistor Rt. The control unit 240 generates a first working frequency according to the resonance capacitor Ct and the resonance resistor Rt. The control device 244 receives a reference voltage (not shown), and generates the control signal S6 according to the first working frequency and the feedback voltage V5 in the predetermined period so as to control the voltage converter 210 to output the second AC voltage V3. The control device 244 may be a pulse width modulator.

After the predetermined period, the inverter 200 changes an impedance value of the resonance circuit 242 through the frequency switcher 250 electrically connected to the resonance circuit 242, and enables the control unit 240 to generate a second working frequency. The control device 244 generates the control signal S6 according to the second working frequency, the reference voltage and the feedback voltage V5 so as to control the second AC voltage V3 outputted by the voltage converter 210.

FIRST EMBODIMENT

Figure 3:
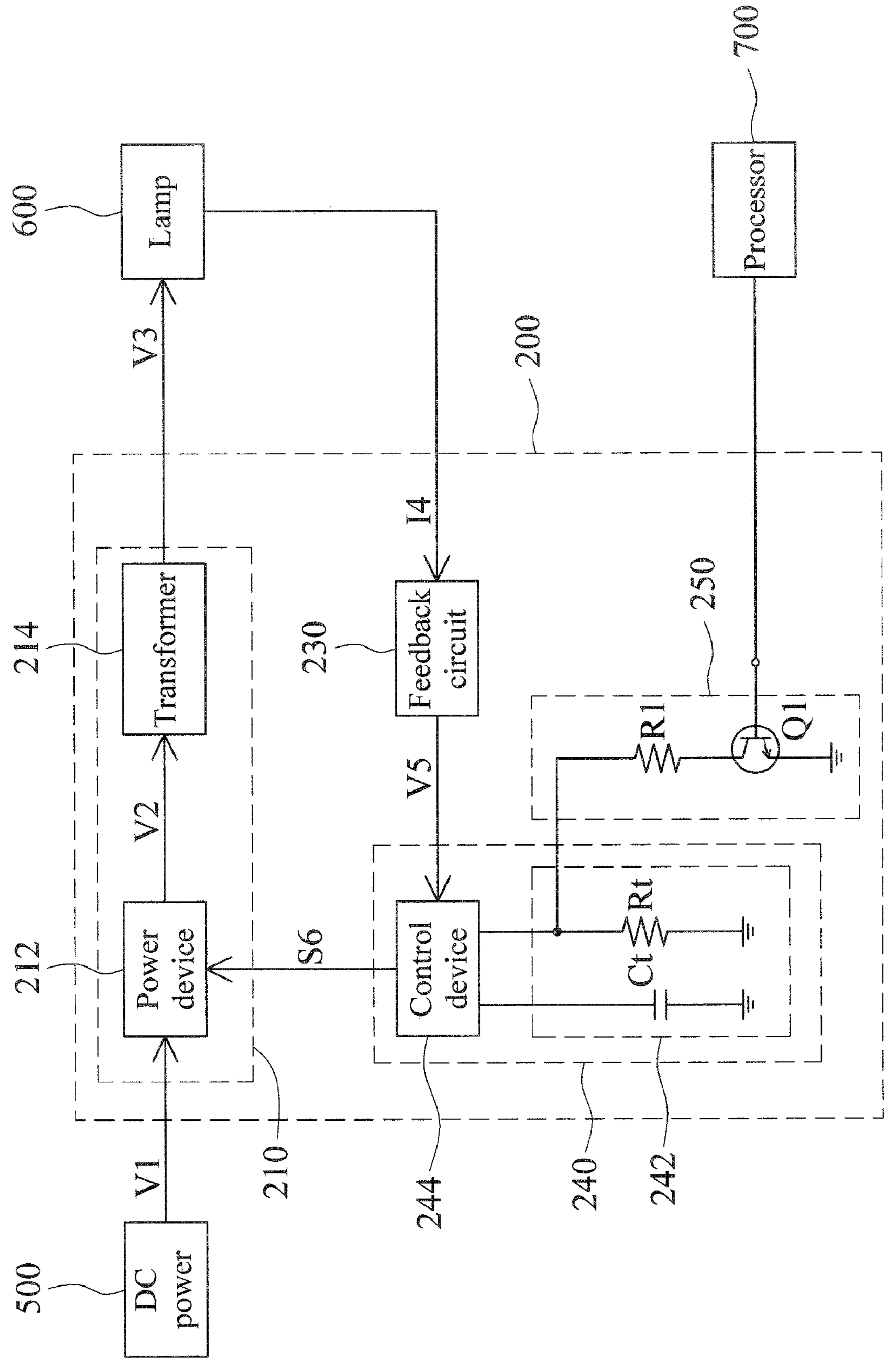
FIG. 3 is a block diagram showing an inverter capable of switching working frequency according to a first embodiment of the invention.

FIG. 3 is a block diagram showing an inverter capable of switching working frequency according to a first embodiment of the invention. In detail, the voltage converter 210 includes a power device 212 and a transformer 214. The power device 212 receives the DC input voltage V1, converts the DC input voltage V1 into a first AC voltage V2 according to the control signal S6, and then outputs the first AC voltage V2. The transformer 214 receives the first AC voltage V2, boosts the first AC voltage V2 into the second AC voltage V3, and then outputs the second AC voltage V3 to the lamp 600. The lamp 600 is activated by the second AC voltage V3 and generates the feedback current 14. The feedback circuit 230 converts the feedback current 14 into the feedback voltage V5 and outputs the feedback voltage V5 to the control device 244.

The control device 244 receives a reference voltage (not shown in FIG. 3) and outputs the control signal S6 to control the first AC voltage V2 outputted by the power device 212 according to the reference voltage, the feedback voltage V5 and the first working frequency in a predetermined period. After the predetermined period, the inverter 200 changes the impedance value of the resonance circuit 242 through the frequency switcher 250 so as to enable the control unit 240 to generate the second working frequency higher than the first working frequency. At this time, the control device 244 generates the control signal S6 to control the first AC voltage V2 outputted by the power device 212 according to the second working frequency, the reference voltage and the feedback voltage V5.

The frequency switcher 250 for switching the first working frequency to the second working frequency includes an electronic switch Q1 and a parallel resistor R1. The electronic switch Q1 may be an N-type transistor. The control terminal of the electronic switch Q1 is electrically connected to a processor 700 for counting the predetermined period. In the predetermined period, the electronic switch Q1 of the inverter 200 is OFF, and the resonance circuit 242 generates the first working frequency suitable for the lamp 600. After the predetermined period, the processor 700 outputs an enabling signal to turn on the electronic switch Q1 so as to make the parallel resistor R1 and the resonance resistor Rt be connected in parallel and to change the impedance value of the resonance circuit 242 such that the control unit 240 generates the second working frequency suitable for the lamp 600 in the steady state.

SECOND EMBODIMENT

Figure 4:
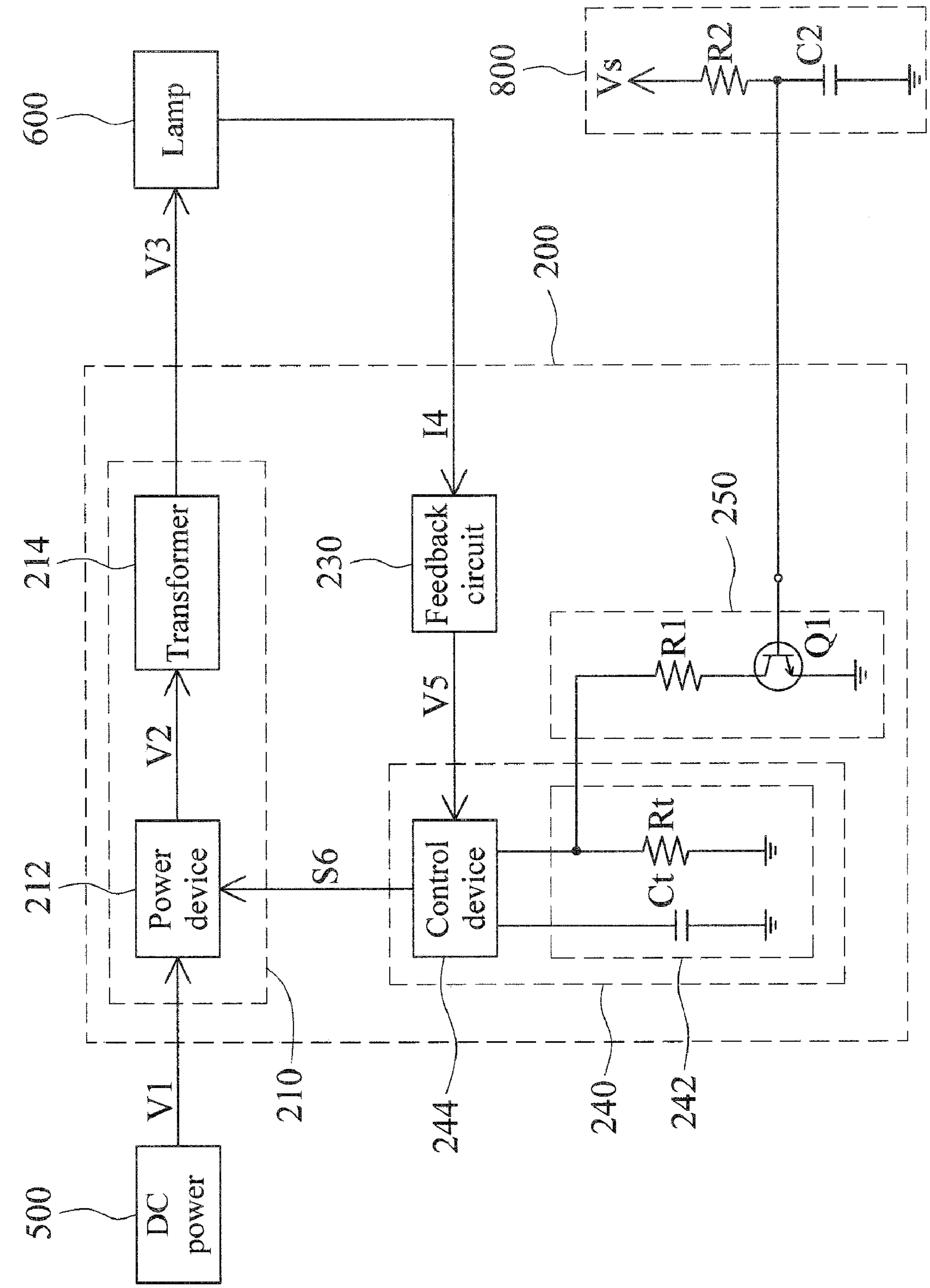
FIG. 4 is a block diagram showing an inverter capable of switching working frequency according to a second embodiment of the invention.

FIG. 4 is a block diagram showing an inverter capable of switching working frequency according to a second embodiment of the invention. Counting the predetermined period is not necessarily done by the processor 700 of the first embodiment. According to the spirit of the invention, a charging loop 800 may be electrically connected to the control terminal of the electronic switch Q1 so that the impedance value of the resonance circuit 242 may also be changed after the predetermined period. The charging loop 800 includes a charging resistor R2 and a charging capacitor C2. The charging resistor R2 has a first terminal and a second terminal, and the charging capacitor C2 has a third terminal and a fourth terminal. The first terminal of the charging resistor R2 is coupled to a charging power Vs, and the second terminal of the charging resistor R2 is electrically connected to the control terminal of the electronic switch Q1 and the third terminal of the charging capacitor C2. The fourth terminal of the charging capacitor C2 is electrically connected to a ground. By selecting the resistance of the charging resistor R2 and the capacitance of the charging capacitor C2, the predetermined period can be controlled. In the inverter 200, the charging power Vs charges the charging capacitor C2 through the charging resistor R2 in the predetermined period. During the charging operation, the voltage across the two terminals of the charging capacitor cannot generate the enabling signal to turn on the electronic switch Q1. The control unit 240 generates the first working frequency according to the resonance resistor Rt and the resonance capacitor Ct. After the predetermined period, the charging loop 800 is fully charged, and the voltage across the two terminals of the charging capacitor C2 generates the enabling signal to turn on the electronic switch Q1 so as to make the parallel resistor R1 and the resonance resistor Rt be connected in parallel. The resonance circuit 242 enables the control unit 240 to generate the second working frequency according to the resonance capacitor Ct as well as the resonance resistor Rt and the parallel resistor R1, both of which are connected in parallel. The inverter 200 therefore can provide the suitable first working frequency and the suitable second working frequency according to the predetermined period, which is determined according to the requirements during the transient period of initially activating the lamp and the steady state after the transient period.

The processor 700 and the charging loop 800 in the first and second embodiments of the invention may be disposed inside or outside the inverter 200. Furthermore, the types of the switch include, without limitation to, an electronic switch and a mechanism switch. In addition, the change made to the resonance circuit in order to switch between different working frequencies is not limited to the change to the resistance of the resonance resistor Rt. The same purpose can be achieved as well by changing the capacitance of the resonance capacitor Ct according to the spirit of the invention.

The inverter capable of switching working frequency according to each embodiment of the invention provides different working frequencies suitable for the lamp during the transient period when the lamp is initially activated and during the steady state after the transient period, respectively. Thus, the invention can improve the unstable state, in which the lamp flickers at the beginning of activation because the working frequency of the conventional inverter is selected only for the steady state of the lamp. Also, the invention can solve the problems of unsymmetry of the waveforms of the positive half cycle and the negative half cycle of the AC voltage, the waveform distortion, and the uneven currents among several lamps during the steady state of the lamp which are caused because the working frequency of the conventional inverter is selected only for the transient period after the lamp is initially activated. Thus, the lamp can have good performance in both the steady state and in the transient state when the inverter of these embodiments is applied to the lamp.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An inverter capable of switching working frequency, the inverter being electrically connected to a lamp and comprising:

a voltage converter for receiving a DC input voltage and transforming the DC input voltage into a second AC voltage according to a control signal so as to activate the lamp, which generates a feedback current;

a feedback circuit for receiving the feedback current and outputting a feedback voltage according to the feedback current;

a control unit, which comprises:

a resonance circuit, which comprises a resonance capacitor and a resonance resistor, wherein the control unit generates a first working frequency according to the resonance capacitor and the resonance resistor; and a control device for receiving the feedback voltage and generating the control signal according to the first working frequency and the feedback voltage in a predetermined period; and a frequency switcher, which is electrically connected to the resonance circuit, for changing an impedance value of the resonance circuit after the predetermined period so as to enable the control unit to generate a second working frequency, wherein the control device outputs the control signal according to the second working frequency and the feedback circuit.

2. The inverter according to claim 1, wherein the frequency switcher comprises a switch and a parallel resistor, and the inverter turns on the switch to make the parallel resistor and the resonance resistor be connected in parallel and to make the control unit generate the second working frequency after the predetermined period.

3. The inverter according to claim 2, wherein the switch has a control terminal electrically connected to a processor, which outputs an enabling signal to turn on the switch after the predetermined period, such that the parallel resistor and the resonance resistor are connected in parallel and the control unit generates the second working frequency.

4. The inverter according to claim 2, wherein the switch has a control terminal electrically connected to a charging loop, which outputs an enabling signal to turn on the switch after the predetermined period, such that the parallel resistor and the resonance resistor are connected in parallel and the control unit generates the second working frequency.

5. The inverter according to claim 4, wherein the charging loop comprises:

a charging resistor having a first terminal, which is coupled to a charging power, and a second terminal, which is electrically connected to the control terminal; and a charging capacitor having a third terminal, which is electrically connected to the control terminal, and a fourth terminal, which is electrically connected to a ground, wherein the charging loop finishes charging according to the charging resistor and the charging capacitor in the predetermined period so as to output the enabling signal.

6. The inverter according to claim 2, wherein the switch is an electronic switch.

7. The inverter according to claim 1, wherein the control device receives a reference voltage, and the control device outputs the control signal according to the reference voltage, the feedback voltage and the first working frequency in the predetermined period, and outputs the control signal according to the reference voltage, the feedback voltage and the second working frequency after the predetermined period.

8. The inverter according to claim 1, wherein the control device is a pulse width modulator.

9. The inverter according to claim 1, wherein the lamp is adapted to the first working frequency in the predetermined period.

10. The inverter according to claim 1, wherein the lamp is adapted to the second working frequency after the predetermined period.

11. The inverter according to claim 1, wherein the voltage converter comprises:

a power device for receiving the DC input voltage, converting the DC input voltage into a first AC voltage according to the control signal, and then outputting the first AC voltage; and a transformer for receiving the first AC voltage, transforming the first AC voltage into the second AC voltage, and then outputting the second AC voltage to the lamp.

12. The inverter according to claim 11, wherein the second AC voltage is higher than the first AC voltage.

13. The inverter according to claim 1, wherein the second working frequency is higher than the first working frequency.

14. The inverter according to claim 1, wherein:

the frequency switcher comprises a switch and a parallel capacitor, the switch has a control terminal electrically connected to a processor;

the processor outputs an enabling signal to turn on the switch so as to make the parallel capacitor and the resonance capacitor be connected in parallel and to make the control unit generate the first working frequency in the predetermined period; and the processor outputs a disabling signal to turn off the switch so as to make the control unit generate the second working frequency after the predetermined period.

15. The inverter according to claim 14, wherein the switch is an electronic switch.

16. The inverter according to claim 1, wherein the frequency switcher changes a resistance of the resonance resistor of the resonance circuit after the predetermined period so as to change the impedance value of the resonance circuit and to make the control unit generate the second working frequency.

17. The inverter according to claim 1, wherein the frequency switcher changes a capacitance of the resonance capacitor of the resonance circuit after the predetermined period so as to change the impedance value of the resonance circuit and to make the control unit generate the second working frequency.

* * * * *